July 1, 1969 H. GANZ 3,452,392
APPARATUS FOR MAKING CIGARETTE FILTERS
Filed Aug. 5, 1968 Sheet 4 of 7

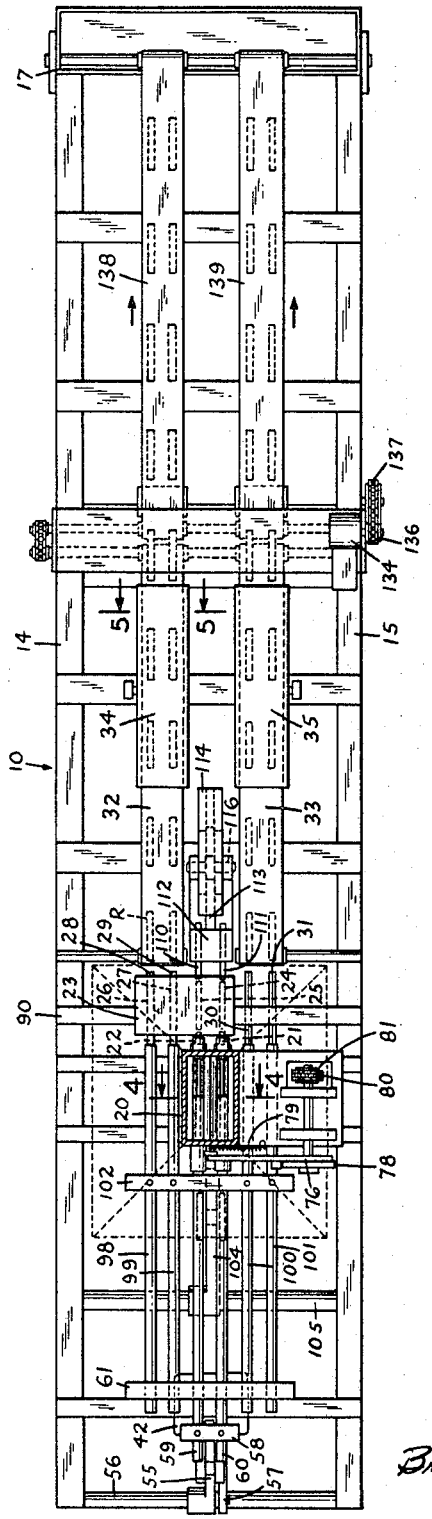

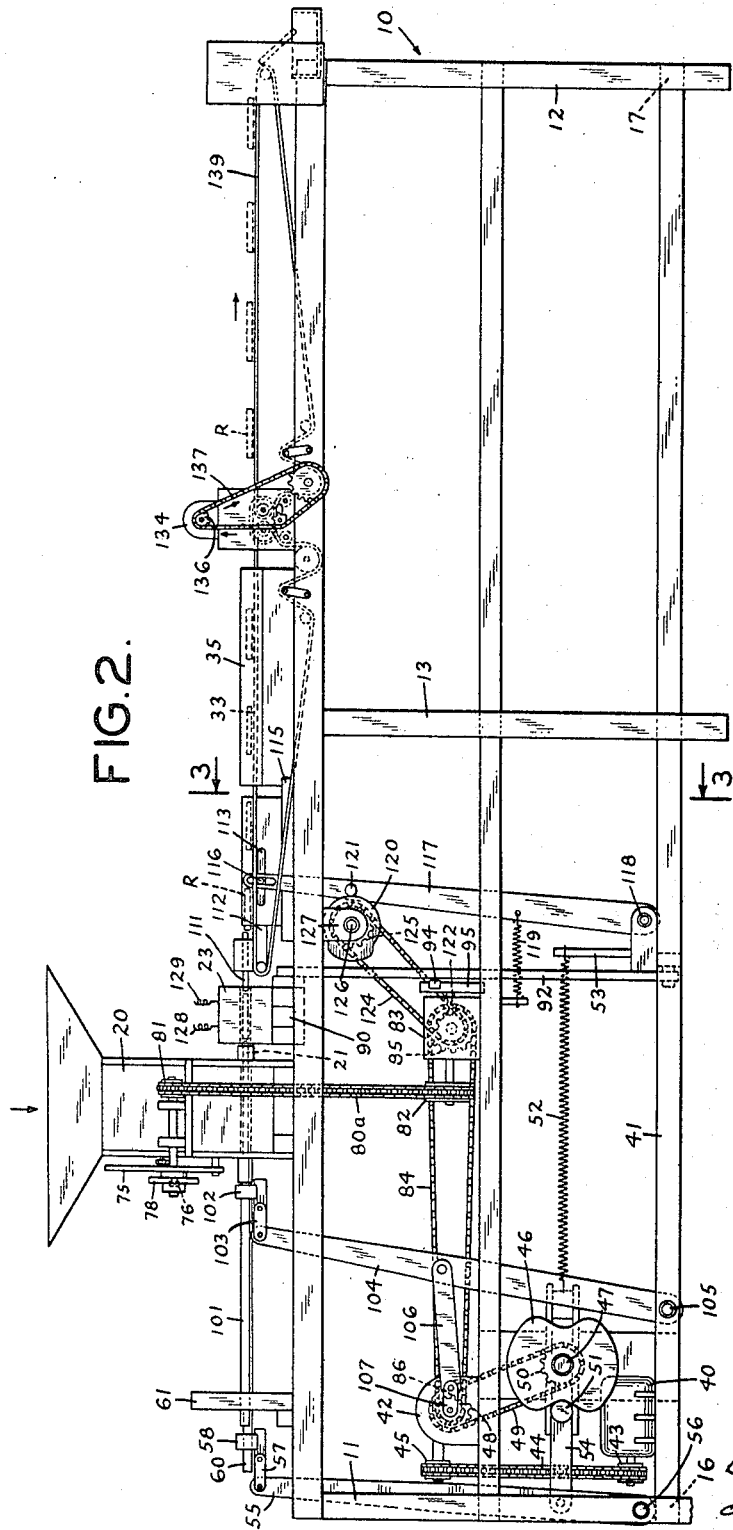

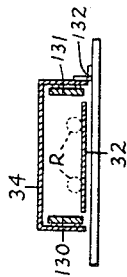
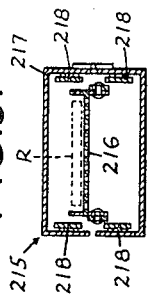
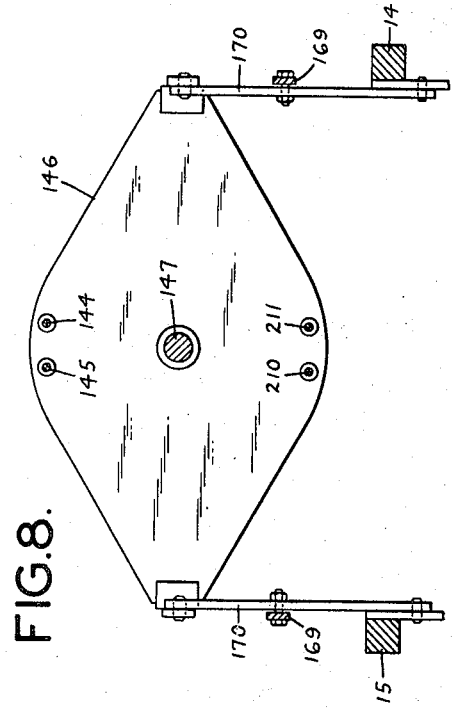
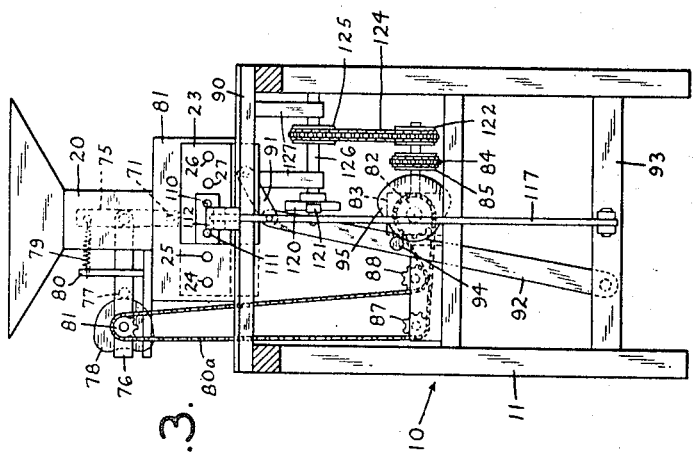

INVENTOR.
HENRY GANZ
BY
HIS ATTORNEYS

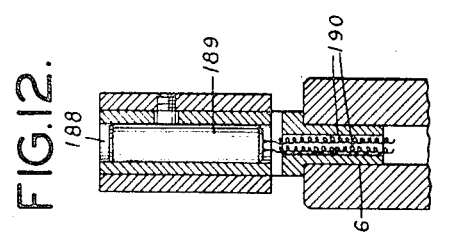
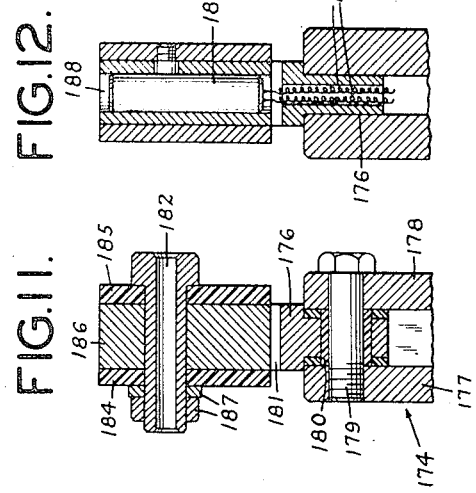
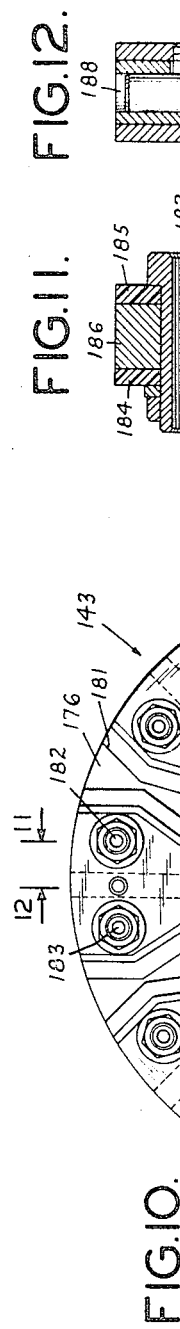
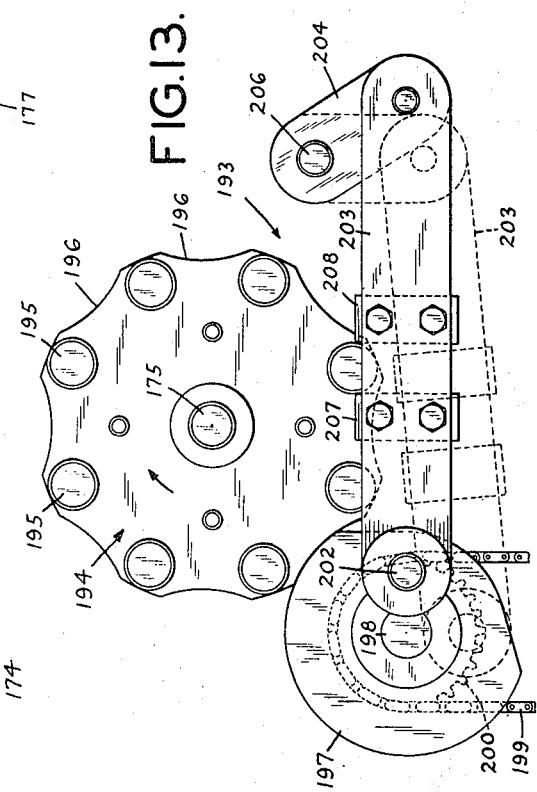

United States Patent Office 3,452,392
Patented July 1, 1969

3,452,392
APPARATUS FOR MAKING CIGARETTE FILTERS
Henry Ganz, West Englewood, N.J., assignor to Lorillard Corporation, New York, N.Y., a corporation of Delaware
Continuation-in-part of application Ser. No. 405,745, Oct. 22, 1964. This application Aug. 5, 1968, Ser. No. 750,121
Int. Cl. A24c 5/50, 5/56; B29j 1/00
U.S. Cl. 18—5                                    16 Claims

ABSTRACT OF THE DISCLOSURE

Apparatus for making rod-like articles from granular materials comprising a mold having an open-ended mold cavity extending through it, a hopper for the materials, and an injector system for injecting material from the hopper into the mold cavity. The injector system includes a passage which is closed except for an opening to receive material from the hopper, a charging rod movable through the passage and a combination agitator and closure member which moves back and forth across the passage opening to assist in filling the open part of the passage but dwells in a position overlying the passage opening to prevent material being pushed back out when the charging rod moves through to charge the mold. For making materials bonded by a thermoplastic bonding agent, the mold is heated so that the bonding agent is softened in the surface portion of the article to render it self-sustaining. An ejector rod ejects the self-sustaining article from the mold, and the article is heated through to fully bond the material.

---

This application is a continuation-in-part of copending application Serial No. 405,745, filed October 22, 1964, and now abandoned.

This invention relates to apparatus for the manufacture of rod-like articles from granular materials, such as filters for cigarettes, cigarillos and other tobacco products and more particularly filters from adsorbent or absorbent granular materials such as activated carbon or charcoal, silica gel, other silicious adsorbent materials and the like.

The use of granular adsorbent or absorbent materials for filtering or removing unwanted components of gases, has been proposed heretofore, and various expendients have been suggested for the utilization of such granular adsorbent materials as filters for tobacco smoke. Due to the granular or finely divided nature of these filtering materials, it has been difficult to form them into filter tips for tobacco products, such as cigarettes, with the equipment which is commonly used in the production of filter tip cigarettes. Some of the filter tips currently made contain the granular materials in a loose state and with plugs of a fibrous material at opposite end of the filter tip to retaian granular material in the filter tip. The combination of loose granular material and fibrous plugs complicates the severing and attaching of the filter tips to cigarettes and has necessitated very substantial changes in the tipping machinery heretofore used in the manufacture of filter tip cigarettes.

Others have proposed that granular adsorbent or absorbent materials might be bonded together by means of plastic bonding agents, but equipment suitable or practical for this purpose has not been divised heretofore for the commercial manufacture of filter tips.

The amount of bonding agent heretofore used causes substantial portions of the surfaces of the granular materials to be sealed and the filtering and absorbing action reduced correspondingly. Moreover, such filter members, when self-sustaining, are relatively rigid and thus when used in a filter tip have a lack of resiliency which is objectionable to the smoker.

In accordance with the present invention apparatus is provided whereby filter rods, equivalent to one or more filter tips, can be made at high production rates and in such a manner that their filtering action and absorbent properties are maintained at a very high level.

More particularly, in accordance with the invention the filtering elements are produced by introducing a mixture of the granular adsorbent material such as, for example, activated charcoal, and a thermoplastic bonding agent such as, for example, polyethylene, polyvinyl acetate, polyvinyl alcohol, polypropylene, polyvinylidene acetate, natural gums, resins, and waxes, in finely divided form into a mold where the mixture is shaped into rods of single or multiple filter tip lengths, as may be desired, and such rods are rendered self-sustaining by applying heat to soften or melt the particles of plastic or bonding agent sufficiently to adhere the granules in the outer surfaces of the rod and thereby render the rods self-sustaining. Following the initial bonding of the particles into rods, they are ejected from the mold and are subjected to further heating to soften the plastic throughout the rods and bond the granules of adsorbent material together to form a filter tip or rod tip which is capable of being handled, cut into filter lengths and attached to cigarettes or the like with conventional filter tipping apparatus.

In accordance with the invention, the amount of bonding agent should not exceed about 15% by weight of the adsorbent granules so that the granules are not coated with the plastic and sealed thereby but instead are united at a number of small areas to render the filter units self-sustaining and somewhat compressible so that the texture or feel of the units when attached to a cigarette is similar to that of the texture or feel of the conventional fibrous filter tip elements. Apparatus capable of producing the filter tips in accordance with the present invention may include various types of molding and heating apparatus which shape and bond the granular particles into multiple or single filter tip length rods at high production rates.

For a better understanding of the present invention, reference may be had to the accompanying drawings in which:

FIGURE 1 is a plan view of a typical apparatus for manufacturing filter tips embodying the present invention, with a portion shown in section to disclose details of the apparatus;

FIGURE 2 is a side elevational view of the apparatus;

FIGURE 3 is an end elevational view of the apparatus;

FIGURE 5 is a view in cross section and on enlarged scale taken on line 5—5 of FIGURE 1;

FIGURE 8 is a view in section taken on line 8—8 of FIGURE 7;

FIGURE 9 is a view in cross section taken on line 9—9 of FIGURE 6;

FIGURE 10 is a view in section taken on line 10—10 of FIGURE 7;

FIGURE 11 is a view in section taken on line 11—11 of FIGURE 10;

FIGURE 12 is a view in section taken on line 12—12 of FIGURE 10;

FIGURE 13 is a view in section taken on line 13—13 of FIGURE 7 with the casing therefor removed.

Figure 4A:
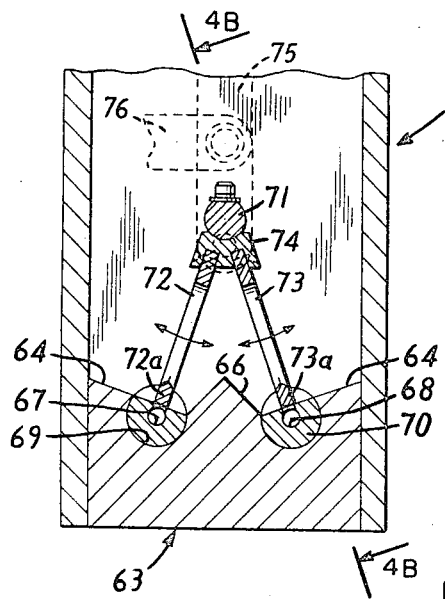
FIGURE 4A is a view in cross section taken on line 4—4 of FIGURE 1 and shown on a larger scale.

The apparatus shown in FIGURES 1 to 5 as illustrative of the invention includes a supporting frame 10 of any suitable type and as illustrated is provided with legs 11, 12, 13 and so forth at the corners and midportion of the frame and with suitable side rails 14 and 15 and end rails 16 and 17 to form a support for the various components of the machine described hereinafter.

The apparatus includes a hopper 20 mounted on the top of the frame 10 and adapted to receive a mixture of granular absorbent or adsorbent material such as activated carbon, granular silica gel, adsorbent silica, calcium carbonate or the like for removing unwanted components from tobacco smoke and a bonding agent, such as an inert thermoplastic resin of the type such as polyethylene, vinyl resins, polyvinylidene resins and the like. The bonding agent is in a finely divided state and is distributed uniformly throughout the granular material in the hopper and in an amount up to about 15 percent by weight of the total mixture. Portions of the mixture are discharged from the hopper 20 by means of feeding or charging plungers 21 and 22 into a heated mold 23 which is provided with two pairs of molding cavities 24 and 25 and 26 and 27. The mold is shiftable transversely of the frame 10 to align one of the pairs of cavities with the plungers 21 and 22 and to dispose the other pair of cavities to one side of the plungers 21 and 22 so that material in the cavities can be ejected by means of ejecting plungers 28 and 29 or 30 and 31 from the offset pair of cavities. Inasmuch as the mold 23 is heated, the outer surfaces of the tips or rods shaped by the mold cavities are bonded together by means of the softened thermoplastic bonding agent to render them sufficiently form-retaining that they can be discharged on one or the other of the conveyor members 32 and 33 and carried through the heating tunnels 34 and 35 where heating and thorough bonding of the filters is completed. The operations described above are conducted in timed sequence and can be accmoplished at high production rates by means of suitable driving mechanisms now to be described.

As shown in FIGURE 2, an electrical motor 40 or the like is mounted on a framework 41 extending between and supported by legs of the frame 10. A reducing gear 42 is driven by the motor 40 by means of the sprocket 43, a chain 44 and a sprocket 45. A cam 46 supported on a shaft 47 rotatably mounted in an upright on the frame 10 is driven by means of the ouput sprocket 48 of the reduction gear, a chain 49 and a sprocket 50 on the shaft 47. A cam follower 51 is biased against the cam 46 by means of a tension spring 52 connected to a pin 53 mounted on the frame 41. The cam follower 51 is connected by means of a link 54 to a lever 55 supported by means of a pivot shaft 56 extending between the sides of the frame 10. At the upper end of the lever 55 is a pivoted link 57 which serves to connect the lever 55 with a cross yoke 58 which is secured to a pair of shafts 59 and 60 on the ends of which the feeding plungers 21 and 22 are mounted. A guide plate 61 extends upwardly from the top of the frame and receives the shafts 59 and 60 for endwise sliding movement. With the structure thus far described, it will be apparent that operation of the motor will cause rotation of the cam at a slower speed than the motor. Inasmuch as the cam 46 has a figure "8" configuration one complete revolution of the cam causes two reciprocations of the plungers 21 and 22. The extent of endwise movement of the plungers 21 and 22 is controlled by the configuration of the cam 46. As indicated above, the plungers 21 and 22 are reciprocated through the hopper 20 to discharge measured amounts of the granular material and a bonding agent from the hopper. The plungers 21 and 22 are moved back and forth so as to withdraw their leading ends partially across the hopper and then project them outwardly through the hopper as viewed in FIGURE 1 into the mold cavities 24 and 25 or 26 and 27 aligned with the plungers.

Figure 4B:
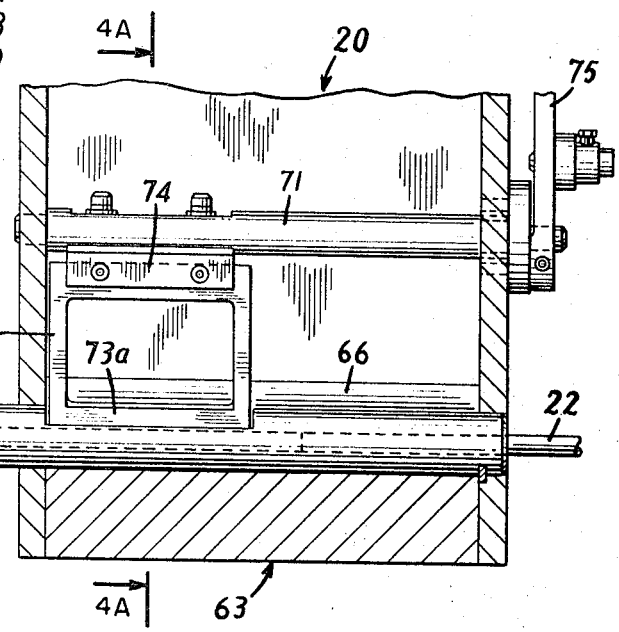
FIGURE 4B is a view in cross-section taken on line 4B—4B of FIGURE 4A and on the scale of FIGURE 4A.

Inasmuch as the granular and finely divided materials have a tendency to bridge and not feed uniformly in front of the plungers, the hopper includes a combination agitating and closure mechanism which assures uniform feeding of the material into the paths of the plungers 21 and 22. Referring to FIGURES 4A and 4B, the bottom of the hopper 20 includes a bottom plate 63 which has a top surface provided with downwardly and inwardly inclined portions 64 and 65 and a generally wedge shaped rib 66 for directing the material into openings in the bores 67 and 68 formed in tubular inserts 69 and 70 installed in the bottom plate 63 of the hopper. The plungers 21 and 22 are slidably received in the bores 67 and 68. Above the ribs 66 and extending lengthwise of the hopper 20 is a shaft 71 which carries downwardly diverging agitating frames 72 and 73 having their upper ends secured to a mounting block 74 fixed to the shaft 71. At the lower end of each frame 72 or 73 is an elongated member or portion 72a or 73a that is of a size substantially coextensive with that of the bore opening, and therefore it covers the opening when in position over it and prevents material in the bore from being pushed back out when the charging rod moves through to fill the corresponding mold.

As shown in FIGURE 3, the shaft 71 and the agitating frames 72 and 73 are adapted to be oscillated back and forth to help feed the material into the bores 67 and 68 through their open portions. Oscillation of the shaft 71 is accomplished by a mechanism comprising a lever 75 fixed to one end of the shaft 71 exterior of the hopper 20 and a cam follower slide 76 pivotally connected to the lever 75 and having a cam follower 77 thereon biased against the periphery of a cam 78 by means of a spring 79 connected to the upper end of the lever 75 and to a fixed pin 80 mounted on the supporting base 81 for the hopper 20. The cam 78 is of heart shaped formation and is so related to the agitating mechanism that before each feeding operation the agitating frames 72 and 73 swing back and forth to opposite sides of the bores 67 and 68 and then move to the position shown in FIGURE 4 covering the open tops of the bores for a dwell period as the feeding plungers 21 and 22 move through the bores to eject the filter material from the then filled bores into the mold 23. Proper timed movement of the cam 78 is accomplished by driving the cam 78 by means of a chain 80a engaging a sprocket 81 on the cam and a second sprocket 82 driven by means of a reducing gear 83. A chain 84 connects the input pulley 85 of reducing gear 83 to a sprocket 86 at the output end of the reducing gear 42. As shown in FIGURE 3, idler sprockets 87 and 88 are rotatably supported by the frame 10 to guide the chain 80 between the pulleys 81 and 82.

Reciprocation of the mold 23 in timed relation to the operation of the feeding plungers 21 and 22 is accomplished in the following manner. The mold 23 is slidably mounted on a transverse guide rail 90 on the frame and is connected by means of a link 91 to the upper end of a lever 92 which is pivotally supported on a cross frame member 93 near the bottom of the frame 10 as shown in FIGURE 3. Other guiding means may be included if desired to prevent tilting or displacement of the mold 23. A cam follower 94 at about the middle of the lever 92 engages a cam 95 also driven by the reducing gear 83 and hence in timed relation to the movement of the ejecting plungers and the agitating mechanism in the hopper. The design of the cam 95 is such as to move the mold 23 transversely to a position aligning the cavities 24 and 25 with the plungers 21 and 22, hold it stationary for a period of time long enough to allow the plungers 21 and 22 to reciprocate twice to introduce two charges of the granular material into each of the mold cavities. It has been found advantageous to fill the cavities with several small charges rather than a single charge in order to maintain a more uniform density of the filter material throughout the entire length of each cavity. After the cavities 25 and 24 are filled and the plungers 21 and 22 are retracted out of the cavities, the mold is moved transversely to align the cavities 26 and 27 with plungers 21 and 22 to allow these cavities to be filled. This cycle of operation is controlled and timed so that as one pair of cavities is being filled the molded rods in the other pair of cavities are ejected.

Referring now to the FIGURES 1 and 2, the ejecting plungers 28, 29, 30 and 31 are detachably mounted on shafts 98, 99, 100 and 101 which are fixed to a cross head or yoke 102 and have their end portions slidably received in the guide plate 61. The yoke 102, as shown in FIGURE 2, is connected by means of a link 103 to the upper end of a lever 104 which is supported for oscillating movement on the pivot 105 on the lower frame unit 41. A link 106 is pivotally and adjustably connected to about the midportion of the lever 104 and to a crank 107 concentric with the sprocket 42 and driven at the same number of revolutions per minute as the cam 46. It will be apparent, therefore, that the yoke 102 and the ejecting plungers thereon make one complete reciprocation for every two reciprocations of the feeding plungers 21 and 22. Accordingly, while the ejecting plungers 21 and 22 are filling one pair of cavities in alignment therewith, one pair of the ejecting plungers 28 and 29 or 38 and 39 is advanced through the cavities in the mold 23 aligned therewith and the filter rods are ejected onto one or the other conveyor belts 31 and 32. As shown in FIGURE 1, the plungers 28 and 29 have ejected a pair of filter rods $r$ onto the conveyor 32. Upon withdrawal of the projecting plungers 28 and 29 and the feeding plungers 21 and 22, the mold 23 is moved downwardly as viewed in FIGURE 1 to align the cavities 24 and 25 with the plungers 30 and 31 and the cavities 26 and 27 with the feeding plungers 21 and 22. The rods which have been formed in the cavities 24 and 25 are ejected into the conveyor 33 as the cavities 26 and 27 are being filled.

In order to properly pack the feeding material in the cavities, it is necessary to close their right-hand ends as viewed in FIGURE 1. As shown in FIGURES 1 and 2, back-up plungers 110 and 111 are adapted to enter the right-hand ends of the cavities which are in alignment with the feeding plungers 21 and 22. A slide plate 112 to which the plungers 110 and 111 are fixed is mounted on a slide 113 slidably received in tubular guide 114 mounted on a frame cross member 115. A shaft 116 affixed to the slide 112 and extending through a slot in the guide is slidably and rotatably connected to an upper end of the lever 117 carried by a pivot shaft 118 on the lower frame 41 and is biased by means of a spring 119 against a cam 120. A cam follower 121 on the lever engages the cam 120 which is driven by means of a sprocket 122 at the input end of the reducing gear 83, a chain 124 and a sprocket 125 fixed to the shaft 126 on which the cam 120 is mounted. A suitable support 127 for the shaft 126 extends downwardly from the top of the frame 10. In this way, the back-up plungers enter the ends of the mold cavities during a mold filling operation and are withdrawn before the mold is shifted to a new charge receiving position.

As indicated above, the mold 23 is heated in any suitable way such as by means of electric heating elements connected to terminals 128 and 129. The mold is heated sufficiently to soften or melt the bonding agent and unite the adsorbent granules at the outer surfaces of the filter rods so that when the rods are discharged onto the conveyors 32 and 33 they will not break up.

Further heating of the rods is required to complete the bonding of the granules and to that end, the conveyors 32 and 33 pass through the heating tunnels 34 and 35 which overlie the conveyors. As shown in FIGURE 5 the tunnels 34 and 35 are provided with resistance heaters 130 and 131 or the like disposed above and at opposite sides of the conveyors. Also, the tunnels 34 and 35 may be supported by means of hinges 132 to enable them to be swung away from and uncover the conveyors for inspection and servicing.

The conveyors 32 and 33 may be driven in any suitable way such as, for example, by means of an electric motor and reducing gear 134 carried by the frame 10 and a sprocket 136 and a chain 137 and other suitable gears. Other aligned conveyors 138 and 139 are geared to the chain 137 to carry away and cool the filter rods. Inasmuch as the adsorbent or absorbent grains are bonded together throughout the length and cross section of the filter rods, the rods can be handled without breakage and can be wrapped in tipping paper and passed through the cutters and tipping machinery in the same manner as ordinary fibrous filter tips. The finished filters may be provided with a covering plug of a fibrous material in one or both ends, for appearance sake, but such plugs are not required to prevent loss of the granular material. Also, due to the fact that the bonding material is in a finely divided state in a mixture with the granular material, it serves as a spot adhesive to unite or bond the granular material without covering any substantial portion of the surface of the granules and in that way, the filtering action of the granules is not greatly diminished.

Figure 6:
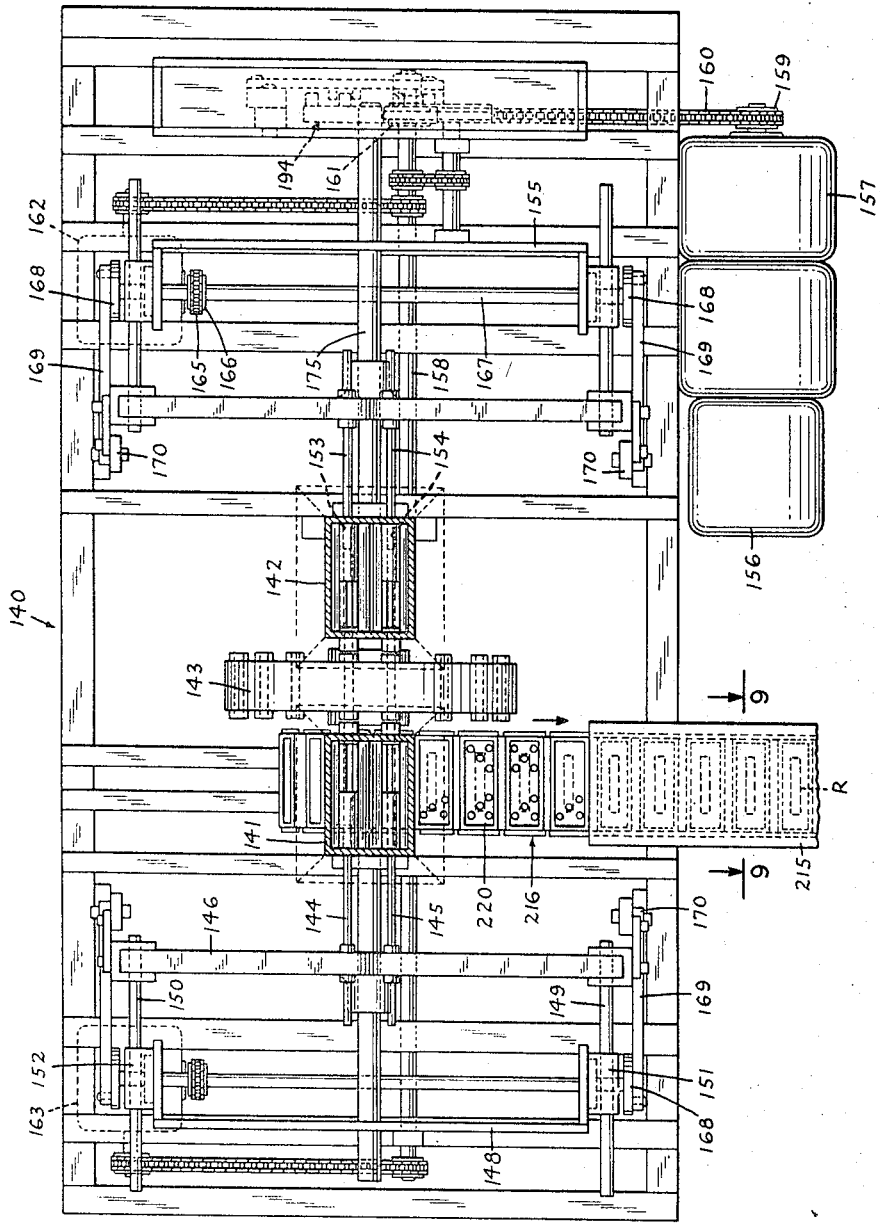
FIGURE 6 is a plan view, partially broken away, of a modified form of apparatus according to the present invention.
Figure 7:
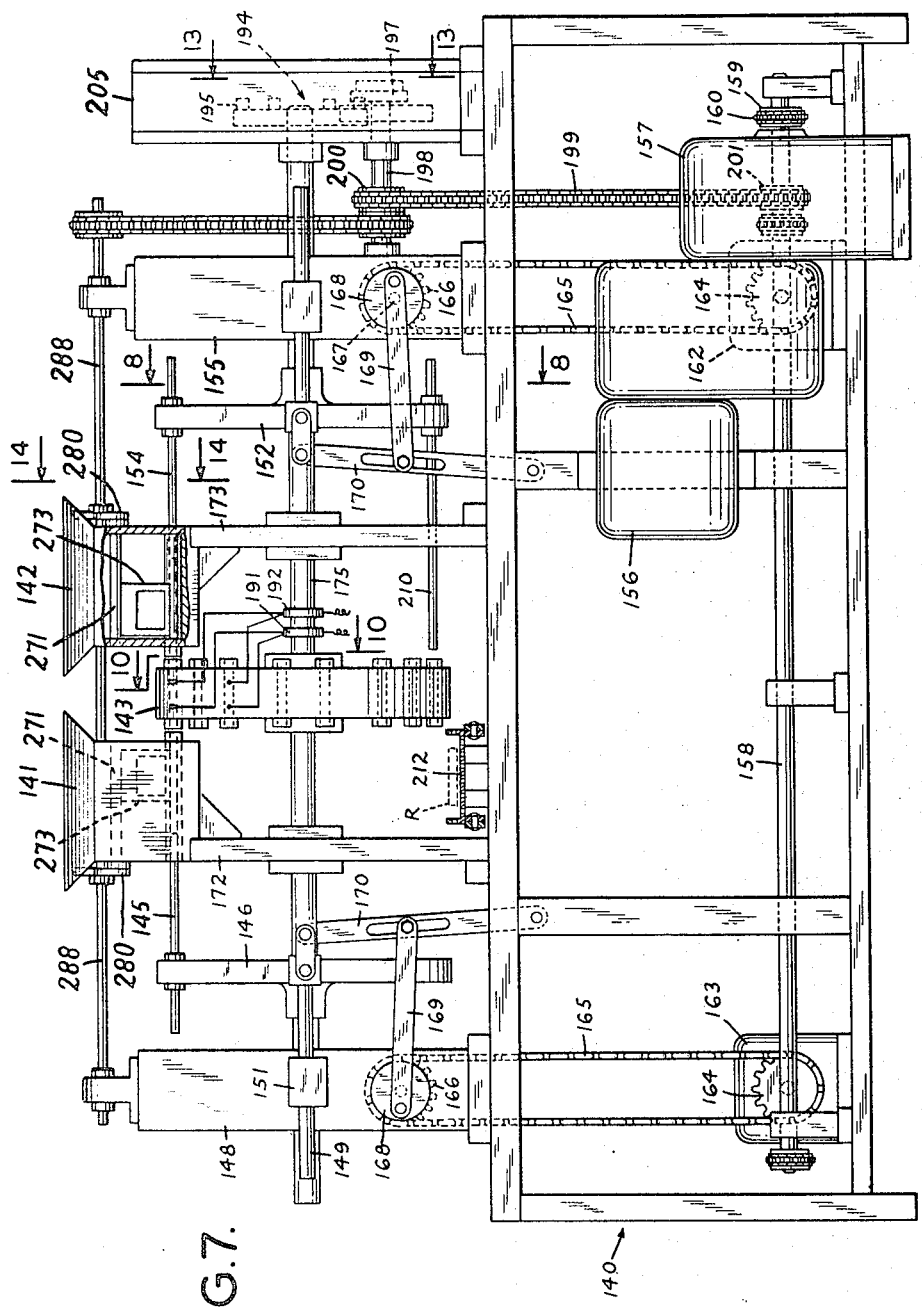
FIGURE 7 is a side elevational view of the apparatus with a part thereof shown in cross section.

The above described form of invention makes use of a reciprocating mold, but the invention is not limited to the use of such a reciprocating mold. As shown in FIGURES 6 to 14 inclusive, the apparatus may comprise a rotary mold which is driven in timed relation to the mechanism for introducing the filtering material into the mold. Referring now to FIGURE 6, a typical filter rod machine includes a frame 140 of any suitable type which carries two hoppers 141 and 142 of the type described above disposed on opposite sides of a rotary mold member 143. Each of the hoppers 141 and 142 is provided with an agitating and closure mechanism of the type shown in FIGURES 4A and 4B. As shown in FIGURE 7, each of the agitating and closure mechanism includes frame-like members 273 carried by a shaft 271 extending through the respective hoppers. The feeding plungers for each of the hoppers also are similar to the feeding plungers 21 and 22 described above. Thus, hopper 141 receives slidably the plungers 144 and 145 which are fixedly mounted in a cross-head 146 of diamond shape which is guided for horizontal reciprocating motion. The cross-head 146 is guided by means of shafts 149 and 150 fixed to the ends of the cross-head and slidable in sleeves 151 and 152 at opposite ends of the guide 148. The cross-head 152 which carries the feeding plungers 153 and 154 for the hopper 142 is similarly mounted on the guide or support 155. The cross-heads are moved by means of the motor 156 and reducing gear 157 which drives a main drive shaft 158 by means of a sprocket 159, a chain 160 and a sprocket 161 fixed to the main drive shaft 158 suitably supported for rotation in the frame 140. The shaft 158 is connected to and drives two reducing gears 162 and 163. Reducing gear 162 is connected by means of a sprocket 164 and a chain 165 to sprocket 166. The sprocket 166 is mounted on a shaft 167 extending across the frame 140 and having crank discs 168 at its opposite ends. Connecting rods 169 connect the crank discs to levers 170 having their lower ends pivotally connected to the frame 140 and their upper ends pivotally connected to opposite ends of the cross-head 152.

The cross-head 146 is connected to and driven in the same way from the reducing gear 163 so that the cross-heads 146 and 152 move toward and away from each other in timed relation. The strokes of the cross-heads can be regulated so that the feeding plungers deliver equal amounts of filter materials into opposite ends of the cavities of the rotary mold 143 to assure uniformity of the filter rods from end to end.

Figure 14:
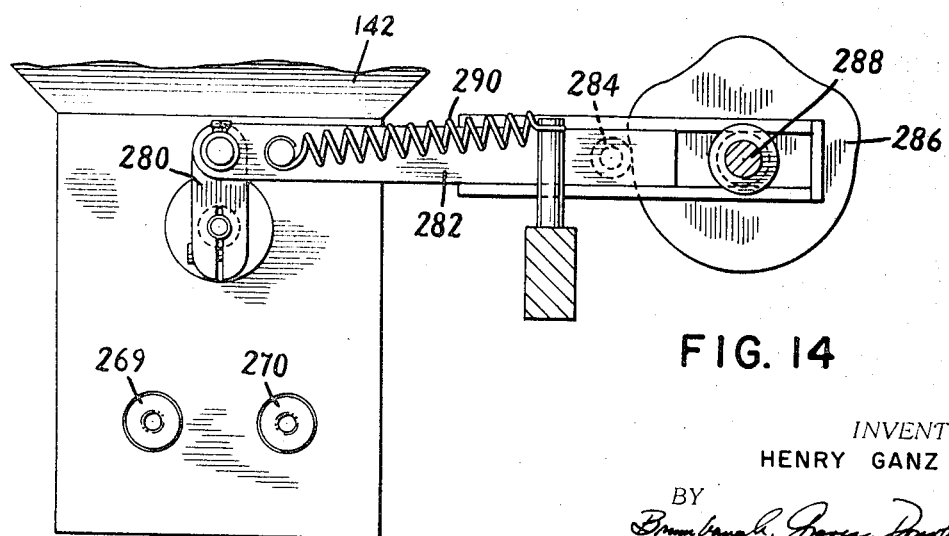
FIGURE 14 is a detail view, on a larger scale, of a mechanism in the embodiment of FIGURES 7 et seq., the view being taken along the lines 14—14 of FIGURE 7.

Introduction of the filter materials into the bores of the feeding tubes 269 and 270 in the respective hoppers 141 and 142 is aided by the agitating mechanism frames 273 which are moved back and forth across the feeding tube openings by oscillating the shafts 271 carrying them. Referring to FIGURE 14 the shaft 271 in each of the hoppers carries a lever 280 adjustably fixed to it at one end and pivotably connected at its other end to a cam follower slide 282. A cam follower 284 on the slide 282 bears against the periphery of a cam 286 carried on a shaft 288, the slide 282 and thus the follower being spring-loaded toward the cam by a spring 290. The cam surface, as shown has three high points in generally one-half its cycle, so that three oscillations of the agitating frames take place on each cycle. The other approximately one-half of a cam cycle provides a dwell period, during which the agitating frames cover the openings in the feed tubes and prevent material from being pushed out of the tubes as the injector rods move forward through the tubes to feed material from them into the molds, just as in the other embodiment as described above. The cams for each hopper feed mechanisms are carried on a single shaft 288 driven from the main machine drive and operate, of course, in synchronism with the injector rods so that one cycle of the agitating frames corresponds to one cycle of the injector rods.

As illustrated in FIGURE 7, the hoppers 141 and 142 are mounted on frame uprights 172 and 173 carried by the frame 140 so that the feeding plungers are in alignment with cavities in the mold 143 at the top thereof.

As shown in FIGURE 10, the mold 143 includes a central disc-like member 174 fixed to a drive shaft 175 which extends lengthwise of the frame 140 and is rotatably supported by and through the uprights 172, 173, the cross-heads 146 and 152 and the guide plates 148 and 155. The disc-like member or hub 174 carries spider 176 having a plurality of generally radially extending notches in its periphery. As shown in FIGURE 11, the hub 174 is composed of two disc-like plates 177 and 178 in spaced apart relation so that the spider 176 is disposed between them and is secured to the disc by means of bolts 179. Heat insulating bushings 180 are interposed between the plates 177 and 178 and the spider 176 to reduce expansion and contraction of the mold to a minimum. Mounted within notches 181 in the spider are the molding and heating elements. Each molding element includes a pair of tubular sleeves 182 and 183 formed of metal such as stainless steel or the like which extend through a pair of heat insulating non-metallic plates 184 and 185 on opposite sides of a metal block 186.

A nut and washer 187 is threaded on the end of each sleeve 182 and 183 to clamp and to secure the plates 184 and 185 against the block 186 and the spider 176. The plates 184 and 185 can be bolted or rivetted to the spider 176. Disposed between the sleeves 182 and 183 which form the mold cavities is a radial bore 188 in which is received an electric resistance heating unit 189 by means of which the block 186 and the mold cavity sleeves 182 and 183 are heated. The wires 190 for the heating element extend downwardly through bores in the spider 176 and are connected to slip rings 191 and 192 mounted on the shaft 175 to which the rotary mold is affixed. The slip rings are connected to a suitable source of electrical energy by means of brushes, not shown.

In order to introduce the filter material into successive pairs of mold cavities 182 and 183, the rotary mold 143 is moved intermittently. To that end, the shaft 175 is connected at its right-hand end to an intermittent drive 193 of the type disclosed in the Ganz U.S. Patent No. 2,521,211 dated September 5, 1950, or its equivalent. As shown generally in FIGURE 13, the intermittent drive includes a Geneva wheel 194 fixed to the end of the shaft 175 and provided with a plurality of cylindrical pins 195 around its periphery. Also, the periphery of the wheel 194 is provided with a series of concavities 196 complemental to the periphery of a drive wheel 197 which is mounted on a shaft 198 driven from the main shaft 158 by means of a chain 199 and sprockets 200 and 201. The shaft 198 also carries a crank 202 which is connected to one end of a drive bar 203. The opposite end of the bar 203 is pivotally connected to a lever 204 mounted in the casing 205 on a pivot shaft 206. The relationship of the crank, drive disc and the Geneva wheel is such that upon rotation of the drive wheel 197, a pair of pin engaging blocks 207 and 208 on the drive bar engage a pin 195 and rotate the wheel 194 one step and then move out of engagement with the pin as shown in dotted lines in FIGURE 13. At this stage, the periphery of the drive wheel 197 engages a cavity 196 in the periphery of the Geneva wheel 195 and retains it against rotation. The mold 143 is moved step by step to move successive pairs of cavities into alignment with the filling plungers 144 and 145 and 153 and 154 to enable the cavities to be filled and the material therein to be heated to render self-sustaining the rods formed in the cavities. The rods R are ejected from the cavities at the bottom of the mold 143 as shown in FIGURE 7. Ejection is accomplished by means of ejecting plungers 210 and 211 fixed to the lower edge of the cross-head 152 and guided in openings in the upright 173. The ejecting plungers 210 and 211, move in unison with the feeding plungers and thus eject the rods from the lower-most cavities onto a conveyor 212 which extends transversely to the frame 140 and carries the rods through the heater 215. As shown in FIGURE 9, the heater 215 may consist of a tunnel 217 provided with resistance heaters 218 above and below the conveyor 216. The conveyor 212 may be composed of a series of hingedly connected perforated through members 220 each receiving a pair of filter rods R enabling them to be heated from above and below.

While the rotary mold apparatus disclosed in FIGURES 6 to 15 is illustrated as having two hoppers for supplying the mixture of granular material and bonding agent to the mold 143, it will be understood that a single feeding hopper and a single set of feeding plungers operated in a series of strokes may be used to fill the molds as, for example, in the manner shown in the FIGURES 1 and 2. In this case, the ejecting plungers may be independently operated and suitable pack-up plungers may be provided to assure uniform filling of the molds.

It will be understood that the apparatus is susceptible to further modification, as, for example, in type of heaters used for heating the molds, in the provision of cooling means for cooling the feeding, ejecting and backup plungers and in the mechanism for driving the apparatus in timed relation. Thus, hydraulic or pneumatic motors may be used for reciprocating the plungers.

Accordingly, the embodiments of the invention described above should be considered as illustrative and the invention is limited only as defined in the following claims.

I claim:

1. Apparatus for molding rod-like articles from a granular material comprising a receptacle for the granular material, a mold adapted to be positioned adjacent to the receptacle and having an open end facing the receptacle, means associated with the receptacle for charging the material into the mold through its open end including means defining an elongated charging passage open at both ends and aligned with the mold, the charging passage being closed over a portion of its length but having an opening disposed to communicate with the receptacle to receive material therefrom, a charging rod movable through the charging passage, means for reciprocating the charging rod between a position clear of the opening to permit material to enter the passage and a position in which the rod enters the mold so that material admitted into the passage is pushed out of the passage and into the mold, a combination agitator and closure structure in the receptacle including a member substantially coextensive with the opening in the charging passage and movably mounted selectively to cover the said opening to prevent material therein from being pushed back out through the passage opening upon movement of the charging rod to push material into the mold, and means for moving the agitator and closure structure member into and out of its position covering the passage opening in timed relation to the movement of the charging rod.

2. Apparatus according to claim 1 wherein the mold is open at both ends, and further comprising means mounting the mold for movement relative to the receptacle, means for moving the mold to shift it to a position remote from the receptacle, and means for ejecting the article from the mold including an ejector rod mounted for movement into and out of the mold when the mold is in the said remote position, and means for moving the ejector rod into one end of the mold to push the article out of the other end.

3. Apparatus according to claim 2 wherein there are at least two spaced-apart molds both carried by the mounting means in positions relative to each other and to the charging rod and ejecting rod such that when one mold is aligned with the charging rod the other is aligned with the ejecting rod.

4. Apparatus according to claim 3 wherein the means for moving the charging rod and the means for moving the ejector rod include a member carrying both rods, and drive means common to both rods to move them conjointly.

5. Apparatus according to claim 3 wherein the means mounting the molds including a member mounted for rotation, and wherein the means for moving the molds included means for indexing the member to bring successive molds into aligned relation first with the charging rod and then with the ejecting rod and providing a dwell period in which the molds reside in such aligned positions.

6. Apparatus according to claim 1 wherein the combination agitator and closure structure includes means for repeatedly moving the said member thereof back and forth across the open portion of the charging passage when the charging rod is retracted in its position clear of the opening and for providing a dwell period in which the member covers the opening as the charging rod is moved through the passage to push the material out of the passage and into the mold.

7. Apparatus according to claim 1 wherein the granular material includes a heat activated bonding component and further comprising means for heating the mold to heat the mixture therein partially through to soften the bonding agent at the surface of the article to bond the surface to an extent rendering the article self-sustaining means for ejecting the self-sustaining article from the mold, conveyor means disposed to receive the self-sustaining article as it is ejected from the mold and to carry it away from the mold and continuously move it along a path, and means along the path of movement of the article for heating it substantially completely through to activate the bonding component throughout the article and completely bond the granular material thereof.

8. Apparatus for molding rod-like articles from a granular material comprising a receptacle for the granular material, a mold open at both ends and mounted for movement between a charging position in which one open end thereof faces the receptacle and an ejecting position in which it is clear of the receptacle, means associated with the receptacle for charging the material into the mold through the said one open end including means defining an elongated charging passage open at both ends and aligned with the mold when in its charging position, the charging passage being closed over a portion of its length but having an opening disposed to communicate with the receptacle to receive material therefrom, a charging rod movable through the charging passage, means for reciprocating the charging rod between a position clear of the charging passage opening so that material may be admitted into the passage and a position in which the material in the passage is pushed out through the passage and into the mold, and means for ejecting the article from the mold including an ejecting rod mounted for conjoint movement with the charging rod and aligned with the mold when it is in the said ejecting position, the ejecting rod being mounted on a carrier member which also carries the charging rod and being reciprocated by the said reciprocating means.

9. Apparatus according to claim 8 wherein there are at least two molds and wherein the means for moving the molds includes a carrier arranged such that one mold is located in the charging position when the other is located in the ejecting position.

10. Apparatus according to claim 8 wherein the molds are mounted for reciprocating movement along a straight path between the said charging and ejecting positions.

11. Apparatus according to claim 9 wherein the molds are movable between the charging position and two ejecting positions spaced on either side of the charging position and thereby to bring each mold in succession into position first at the charging position and then at one of the ejecting positions.

12. Apparatus according to claim 9 wherein the molds are mounted for rotary movement along a circular path between the said charging and ejecting positions.

13. Apparatus according to claim 8 wherein the means for charging material into the mold further includes a combination agitator and closure structure in the receptacle including a member substantially coextensive with the opening in the charging passage and movably mounted selectively to cover the said opening to prevent material therein from being pushed back out through the opening upon movement of the charging rod to push material into the mold, and means for moving the agitator and closure member into and out of its position covering the passage opening in timed relation to the movement of the charging rod.

14. Apparatus according to claim 13 wherein the means for moving the agitator and closure structure moves the said member thereof across the opening when the charging rod is clear of the opening to assist in introducing material into the charging passage and provides a dwell period in its position covering the opening as the charging rod moves through the passage to charge the mold.

15. Apparatus according to claim 8 further comprising a mold closure rod aligned with the charging rod and means for moving the closure rod into the end of the mold opposite the said one end in timed relation to the movement of the charging rod to charge material into the mold.

16. Apparatus according to claim 8 further comprising a second receptacle for the material disposed adjacent the end of the mold opposite the said one end and means associated with the second receptacle for charging material into the mold from the second receptacle.

References Cited

UNITED STATES PATENTS

| | | | |
|---|---|---|---|
| 337,665 | 3/1886 | Cohen | 18—21 XR |
| 375,615 | 12/1887 | Elges | 18—21 XR |
| 483,663 | 10/1892 | Warren | 18—21 |
| 538,475 | 4/1895 | Albrecht | 18—21 XR |
| 1,627,601 | 5/1927 | Goebel | 18—5 |
| 1,702,636 | 2/1929 | Johnson | 18—5 |
| 2,128,745 | 8/1938 | Huff et al. | 18—21 XR |
| 2,362,701 | 11/1944 | Koehring | 18—12 XR |
| 2,371,709 | 3/1945 | Rineer | 18—12 |
| 2,771,637 | 11/1956 | Silvasy et al. | 18—12 |
| 3,071,812 | 1/1963 | Miller | 18—21 |

WILBUR L. McBAY, *Primary Examiner.*

U.S. Cl. X.R.

18—12, 21